Jan. 15, 1935. W. A. HILLEBRAND 1,988,121
PROTECTIVE MEANS FOR DELTA CONNECTED TRANSMISSION LINES
Filed Aug. 11, 1933

INVENTOR
William A. Hillebrand.
BY
ATTORNEY

Patented Jan. 15, 1935

1,988,121

UNITED STATES PATENT OFFICE 1,988,121

PROTECTIVE MEANS FOR DELTA CONNECTED TRANSMISSION LINES

William A. Hillebrand, Berkeley, Calif., assignor to The Ohio Brass Company, Mansfield, Ohio, a corporation of New Jersey Application August 11, 1933, Serial No. 684,699

3 Claims. (Cl. 175—294)

This invention relates to protective apparatus for electrical transmission lines and particularly for polyphase transmission lines energized by transformers having delta connected secondaries.

One object of the invention is to provide protective means for delta connected transmission lines that will clear the line in case of a ground on any single conductor of the line.

A further object of the invention is to provide protective means of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

Figure 1:
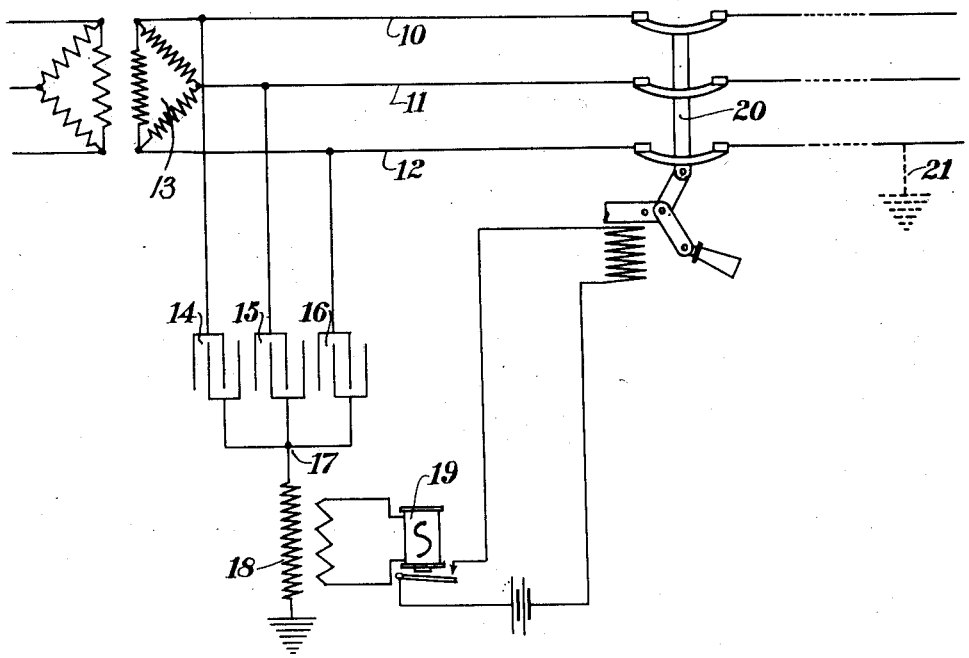

In the drawing Fig. 1 is a diagrammatic view illustrating one embodiment of the present invention.

Figure 2:
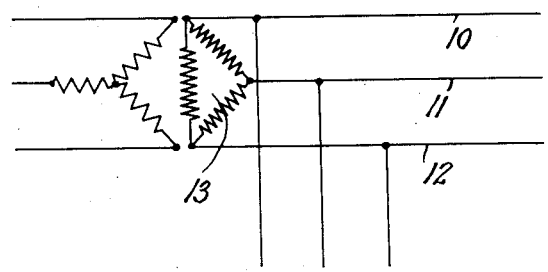

Fig. 2 is a fragmentary diagram showing another connection for the energizing transformer.

Many thousands of circuit miles of electrical transmission lines, particularly in rural areas, are supplied with current from transformers having delta connected secondaries. These lines usually follow the highways and are frequently supported directly over fences so that if a line breaks, it is apt to come in contact with the fence wire so that the entire line of fencing is charged and becomes a menace to life and property. Because of the fact that the line is delta connected and the resistance to ground is frequently high, the usual over-current relay is incapable of clearing such a line when a single conductor ground occurs. In a delta connected system, there is of course no ground connection at the station, hence a ground on the line does not form a complete circuit and the only current flowing through the ground contact will be a comparatively small charging current, insufficient to operate the usual over-current relay. The ground contact, moreover, is usually of high resistance, especially in summer time when the earth is dry, and it is at this time also that there is the greatest danger of fire, resulting from the grounded line.

Over-current relays in each phase of the circuit are commonly used for protecting transmission lines and in delta connected systems are well adapted to open the circuit in case of a phase to phase short but are entirely inadequate to protect such a line from the effects of a ground on a single individual line conductor. In case such a ground occurs, it is apt to remain grounded for an indefinite period, during which time it is a constant menace to life and property. The protective scheme of the present invention may be used in addition to any conventional power relay scheme now in common use and takes care of the single conductor ground on delta connected lines.

In the drawing the numerals 10, 11 and 12 designate the conductors of a three-phase transmission line supplied by transformers 13 having their secondary windings connected in delta, as illustrated in the drawing. The primary windings may be either delta or Y connected as shown in Figs. 1 and 2 respectively. Three condensers 14, 15 and 16 are connected to the transmission lines 10, 11 and 12 respectively; the other terminals of the condensers being connected together at 17, the point 17 being connected to ground through the high voltage winding of a transformer 18. The low voltage winding of the transformer 18 is connected to a voltage relay 19. The relay 19 controls a line circuit breaker 20. The condensers 14, 15 and 16 are preferably of equal electrostatic capacity so that normally their currents balance and there is no voltage between the point 17 and ground, so that no current is supplied to the voltage relay 19. However, in the case of an accidental, one conductor ground, as indicated at 21 on the conductor 12, full delta voltage is immediately impressed on the condensers 14 and 15, the condenser 16 being short-circuited and having no voltage applied thereto.

The vector sum of the currents taken by the condensers 14 and 15 now flows through the primary of the transformer 18, energizing it and causing full voltage to be applied to the relay 19 which will consequently operate to open the circuit.

The voltage relation to ground of the conductors of a delta connected transmission line is an unstable relation since the power station merely maintains relative voltage between the different conductors and not between any portion of the system and ground. The relation of the various individual conductors to ground is therefore easily changed so that when a ground occurs on one of the conductors, even though it may be through a high resistance, this conductor immediately takes on ground potential and the other conductors have full line to line voltage to ground. For this reason the present invention provides sensitive protection against a single conductor ground although the ground may be of relatively high resistance.

Protective systems heretofore applied to transmission lines are quite inadequate for this class of fault on delta connected lines and many lines now in service are a constant menace due to inadequate protection against this particular hazard.

I claim:

1. The combination with a polyphase transmission line supplied by a delta connected source, of means for protecting said line from single conductor grounds, said means comprising condensers each having one terminal thereof connected to one of the respective conductors of said line, the other terminals of said condensers being connected to a common point, a circuit breaker for said transmission line, and means controlled entirely by the voltage between said common point and ground for operating said circuit breaker.

2. The combination with a polyphase transmission line energized by a delta connected source of power insulated from ground, of means for protecting said line against single conductor grounds, said means comprising condensers each having one terminal thereof connected to one of the respective conductors of said transmission line, the other terminals of said condensers being connected to a common point, a transformer having its primary connected between said common point and ground, a voltage relay connected to the secondary of said transformer, and a circuit breaker for opening said transmission line controlled by said relay.

3. The combination with a polyphase transmission line energized by transformers having delta connected secondaries, of means for protecting said transmission line against single conductor grounds, said means comprising a circuit breaker for opening said line, a voltage relay for controlling said circuit breaker, a transformer for actuating said relay, the secondary of said transformer being connected to said relay and the primary of said transformer having one terminal thereof grounded and the other terminal connected through separate condensers to the different conductors of said transmission line so that under normal operation said last named terminal forms a common neutral for said condensers and no voltage is applied to the primary of said transformer; but, in case of a ground on a single one of the conductors of said transmission line substantially the full delta voltage of said line is applied to the primary of said transformer through the condensers connected with the ungrounded conductors, the operation of said relay depending entirely upon the voltage thus applied.

WILLIAM A. HILLEBRAND.